United States Patent [19]
Isoyama et al.

[11] Patent Number: 6,049,527
[45] Date of Patent: Apr. 11, 2000

[54] CELL DISCARD CONTROL SYSTEM FOR AN ATM CELL BUFFER

[75] Inventors: Kazuhiko Isoyama; Toshiya Aramaki, both of Tokyo, Japan

[73] Assignee: NEC Corporation, Tokyo, Japan

[21] Appl. No.: 08/824,051

[22] Filed: Mar. 21, 1997

[30] Foreign Application Priority Data

Mar. 22, 1996 [JP] Japan .................................. 8-093310

[51] Int. Cl.[7] ............................ H04L 12/54; H04L 12/56
[52] U.S. Cl. ........................ 370/235; 370/395; 370/429
[58] Field of Search .................................. 370/235, 230, 370/429, 412, 395, 355; 395/200.65

[56] References Cited

FOREIGN PATENT DOCUMENTS 3-135248  6/1991  Japan .
7-66807   3/1995  Japan .

OTHER PUBLICATIONS

"Buffer Management for Best Effort Traffic in ATM Networks", *IEICE(Institute for Electronics, Information, and Communication Engineers)* Research Conference SSE94–94, 1994, pp. 21–26.

K. Noritake et al., "A study on selective cell discard control in ATM–CL network", pp. 43–48, Technical Report of IEICE, vol. 94, No. 95, Jun. 1994.

*Primary Examiner*—Hassan Kizou
*Assistant Examiner*—John Pezzlo
*Attorney, Agent, or Firm*—Young & Thompson

[57] ABSTRACT

The present invention is to provide a cell discard control system for an ATM (asynchronous transfer mode) cell buffer capable of preventing useless cells which are not restored to an original packet from being transmitted to an ATM network and minimize a discarded number of packets which should not be discarded. It comprises a cell receiving section 11 having a packet identifier adding part 11a for adding a packet identifier for identifying being cellulated from the same packet for an input cell and a cell discard part 11b for discarding cells, a cell buffer 12 for buffering cells transferred from the cell receiving section 11, the cell transmitting section 13 for transmitting cells transferred from the cell buffer 12 to an ATM network and transmitting idle cells instead of discarded cell which have been discarded by a cell discard part 13a, and buffer controller 14 for detecting a packet identifier added to a cell being discarded due to over flow of the cell buffer 12 and instructing the cell receiving section 11 and the cell transmitting section 13 to discard cells having the same packet identifier being detected.

1 Claim, 7 Drawing Sheets

CELL DISCARD CONTROL SYSTEM FOR AN ATM CELL BUFFER

BACKGROUND OF THE INVENTION

1. Field of the Invention

The present invention relates to a cell discard control system for an ATM (Asynchronous Transfer Mode) cell buffer, particularly to a cell discard control system when the ATM cell buffer overflow occurs, e.g. due to input of unexpected traffic volume, for transferring an AAL5 (ATM adaptation layer type 5) cell at a cell transmitting section of an ATM apparatus.

2. Description of the Related Art

As this type of the cell discard control system for an ATM cell (AAL5 cell), the following cell discard control systems have been disclosed in the technical report, title of "Buffer Management for Best Effort Traffic in ATM Networks", of IEICE (Institute of Electronics, Information, and Communication Engineers) Research Conference SSE94-94, 1994 so far: a partial packet discard system and an early packet discard system.

FIG. 6 is an illustration schematically showing operations of the partial packet discard system which is a conventional cell discard control system. As shown in FIG. 6, in the case of the partial packet discard system, when cell 46e in a certain packet, which consists of cells 46a, 46b, . . . , and 46h, is discarded due to overflow of cell buffer 42, the packet without the cell 46e cannot be restored any more at the receiving end even though the rest of cells being transmitted and therefore, control is performed so as to discard all the following cells 46f, . . . , and 46h in the same packet. Thereby, the partial packet discard system makes it possible to decrease a useless number of cells to be transmitted to an ATM network.

FIG. 7 is an illustration schematically showing operations of the early packet discard system which is a conventional cell discard control system. As shown in FIG. 7, in the case of the early packet discard system, when the first cell 56a of a certain packet, consisting of cells 56a, 56b, 56c and 56d, reaches cell buffer 52, if the number of cells in cell buffer 52 exceeds a predetermined threshold at that point of time, control is performed so as to discard all cells 56a, . . . , and 56d in the packet. Thereby, the early packet discard system makes it possible to do away with useless cells to be transmitted to an ATM network.

However, the above-described partial packet discard system has a problem that cells 46a, . . . , and 46d of the same packet already being input to cell buffer 42 are transferred to the ATM network even though control is performed so as to discard all the following cells 46f, . . . , and 46h of the same packet when one cell 46e of those is discarded due to buffer overflow.

Moreover, the above described early packet discard system has a problem that any reached packet is discarded only the condition when the number of cells in the cell buffer exceeds a threshold. It means that a packet which can be saved is also discarded because all cells in a reached packet are discarded even if the number of cells in the packet is smaller than a remaining queue length of the cell buffer 52.

SUMMARY OF THE INVENTION

Therefore, the present invention is made to solve the above problems and its object is to provide a cell discard control system for an ATM (asynchronous transfer mode) cell buffer capable of preventing useless cells which are not restored to an original packet from being transmitted to an ATM network and minimize a discarded number of packets which should not be discarded.

To achieve the above object, the present invention provides a cell discard control system for an ATM cell buffer at a cell transmitting section of an ATM apparatus, which comprises a cell receiving section which receives a flow of AAL5 type ATM cells, adds a packet identifier to each cell for identifying being cellulated from the same packet, and outputs cells with the packet identifier, a cell buffer for buffering a cell transferred from the cell receiving section, a cell transmitting section which transmits a cell transferred from the cell buffer to an ATM network, discards cells in accordance with instructions and transmits idle cells instead of cells being discarded to the ATM network, and a buffer controller which detects a packet identifier added to a cell being discarded due to over flow of the cell buffer and instructs the cell transmitting section to discard cells having the same packet identifier being detected.

Moreover, in the case of a cell discard control system of the present invention, it is preferable that the cell receiving section is further provided with means for discarding cells and the buffer controller instructs both of the cell transmitting section and the cell receiving section to discard cells having the same packet identifier as the cell having been discarded due to overflow of the cell buffer.

In another aspect of a cell discard control system of the present invention, a buffer controller monitors queue length of the cell buffer available for storing cells and detects a packet identifier added to a cell being stored at the end of queue of the cell buffer when queue length becoming shorter than predetermined threshold value. At this time, the buffer controller instructs the cell receiving section to discard cells consisting a packet having the different packet identifier being detected.

In this case, a cell receiving section may detect number of cells consisting each packet, and the buffer controller may instruct the cell receiving section to discard cells consisting a packet having the different packet identifier being detected except for a packet comprising smaller number of cells than queue length available in the cell buffer.

DETAILED DESCRIPTION OF THE PREFERRED EMBODIMENT

The embodiments of the present invention are described below by referring to the accompanying drawings.

Figure 1:
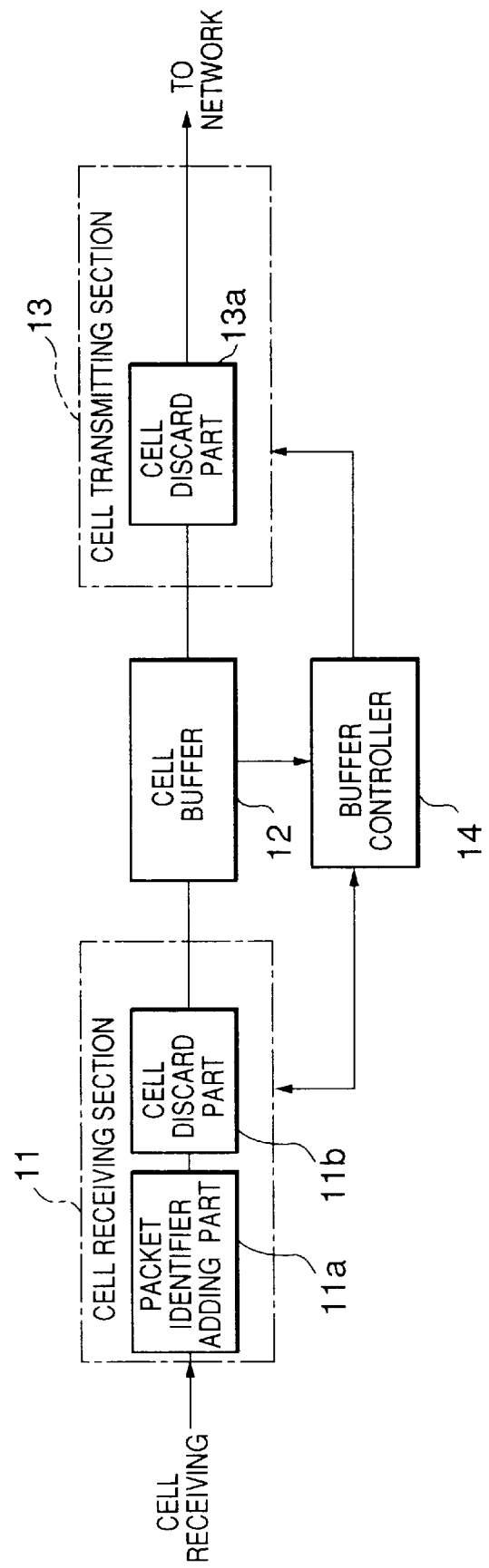
FIG. 1 is a block diagram showing a structure of first embodiment of a cell discard control system of the present invention.

FIG. 1 is a block diagram showing the structure of first embodiment of a cell discard control system of the present invention. As shown in FIG. 1, the cell discard control system of this embodiment comprises a cell receiving section 11, a cell buffer 12, a cell transmitting section 13, and a buffer controller 14.

The cell receiving section 11 comprises a packet identifier adding part iia for adding a packet identifier to each of input AAL5 cells for identifying cells associated with the same packet and a cell discard part 11b for discarding a cell in accordance with an instruction from the buffer controller 14, and the cell transmitting section 13 also includes a cell discard part 13a for discarding a cell in accordance with an instruction from the buffer controller 14.

Figure 2:
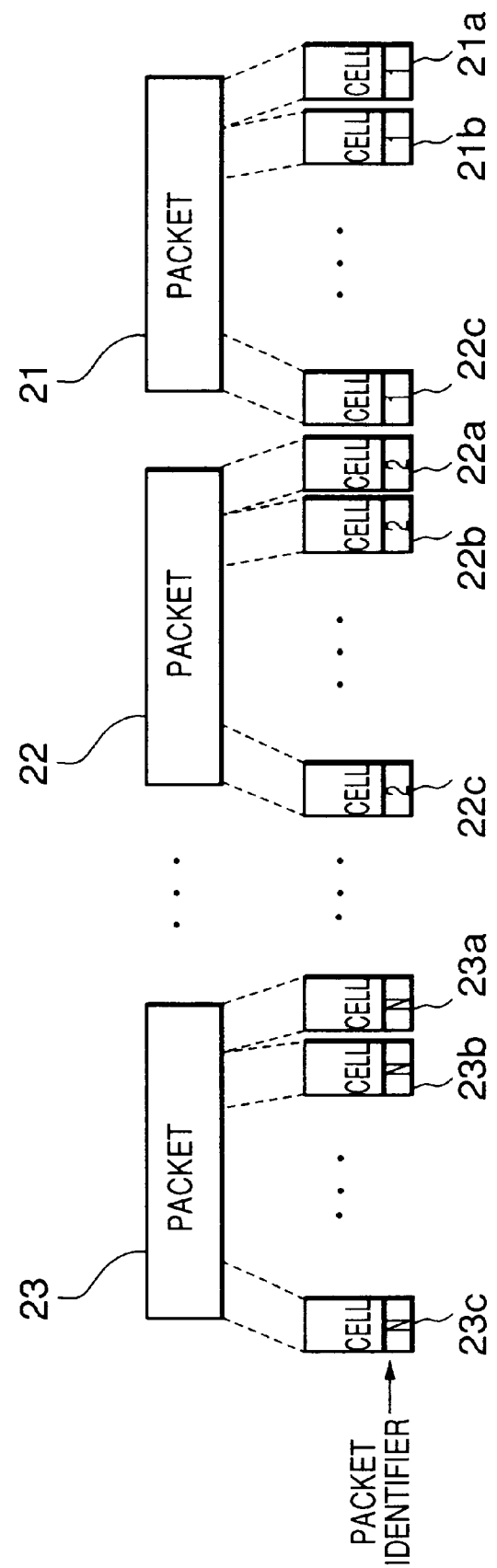
FIG. 2 is an illustration schematically showing the state in which a packet identifier is added to each cell by a packet identifier adding part of an embodiment of the present invention.

FIG. 2 is an illustration schematically showing the state in which a packet identifier is added to each of cells consisting of the same packet by the packet identifier adding part 11a. As shown in FIG. 2, the same packet identifier "1" is added to each of cells 21a, 21b, . . . , and 21c obtained by segmenting packet 21. Similarly, packet identifiers "2" and "N" are added to cells 22a, 22b, . . . , and 22c and cells 23a, 23b, . . . , and 23c obtained by segmenting packet 22 and packet 23 respectively. The packet identifier adding part 11a can discriminate corresponding between the packet identifier and a cell to which the packet identifier is to be added by VCI (virtual channel identifier) and EOM (end of message) cell information contained in a cell header of each cell flowing into the cell receiving section 11. That is a bunch of cells between two EOM cells having the same VCI are regarded as cells segmenting the same packet.

Cells thus added with a packet identifier are input to the cell buffer 12. When a cell discarding occurs due to overflow of the cell buffer 12, buffer controller 14 instructs both of the cell receiving section 11 and the cell transmitting section 13 to discard cells having the same packet identifier as the discarded cell.

Figure 3:
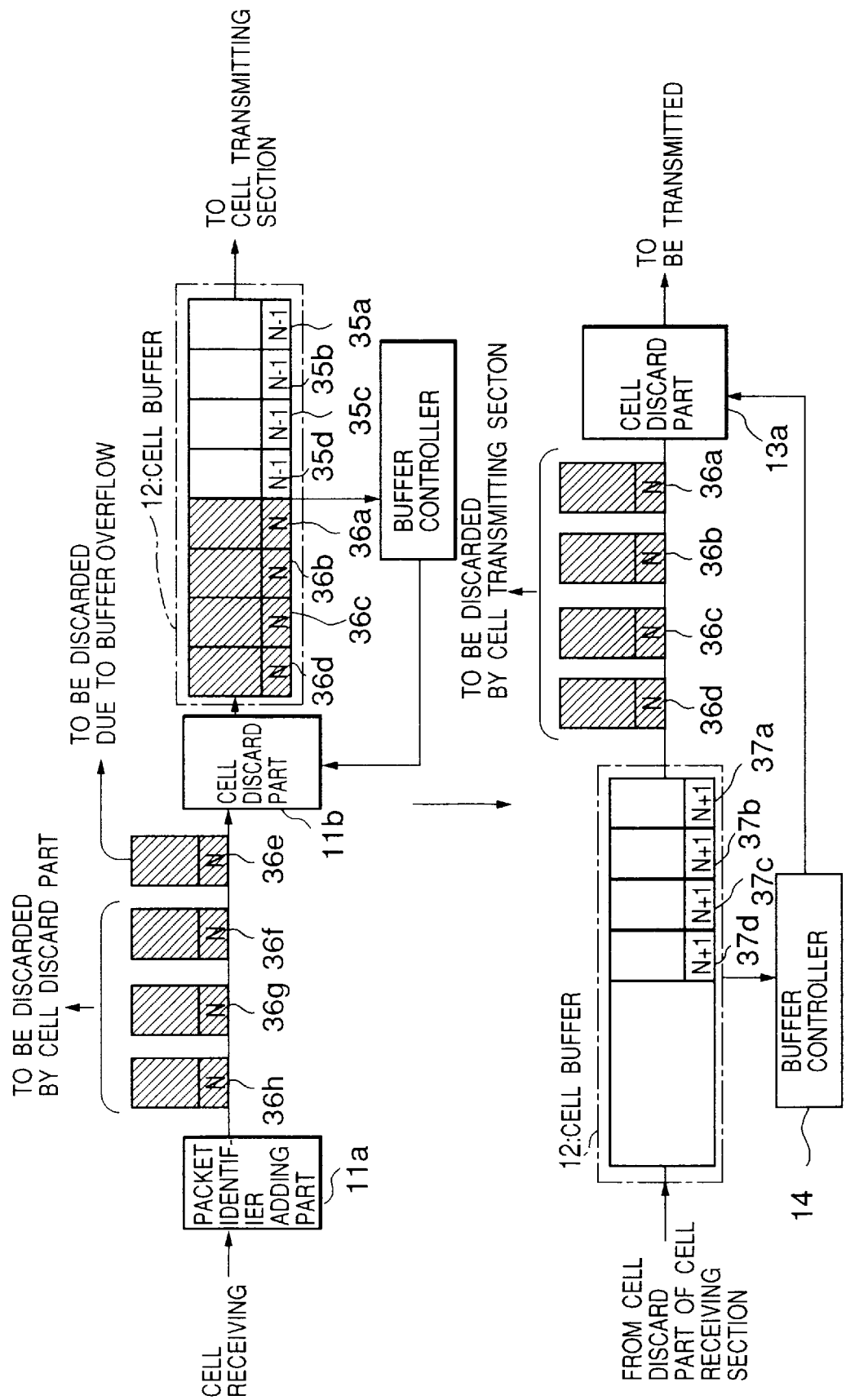
FIG. 3 is an illustration for explaining operations of an embodiment of a cell discard control system of the present invention.

Then, operations of the cell discard control system of this embodiment are described below. FIG. 3 is an illustration for explaining operations of a cell discard control system of the present invention.

In FIG. 3, when cell 36e is discarded due to overflow of the cell buffer 12, packet identifier "N" being added to the cell 36e is stored in the buffer controller 14. The buffer controller 14 controls the cell discard part 11b of the cell receiving section 11 so as to discard continuously input cells 36f, . . . , and 36h having the same packet identifier "N". Moreover, the buffer controller 14 controls the cell discard part 13a of the cell transmitting section 13 so as to discard cells 36a, . . . , and 36d, input from the cell buffer 12 and having the same packet identifier "N", and controls the cell transmitting section 13 to output idle cells instead of discarded cells to the ATM network.

Therefore, the cell discard control system of this embodiment makes it possible, by discarding cells having the same packet identifier as a cell discarded due to buffer overflow, to prevent useless cells, which are unable to be restored to an original packet, from being transmitted to the ATM network, and also prevent extra cells regarded as useless cells from being input to the cell buffer.

Figure 4:
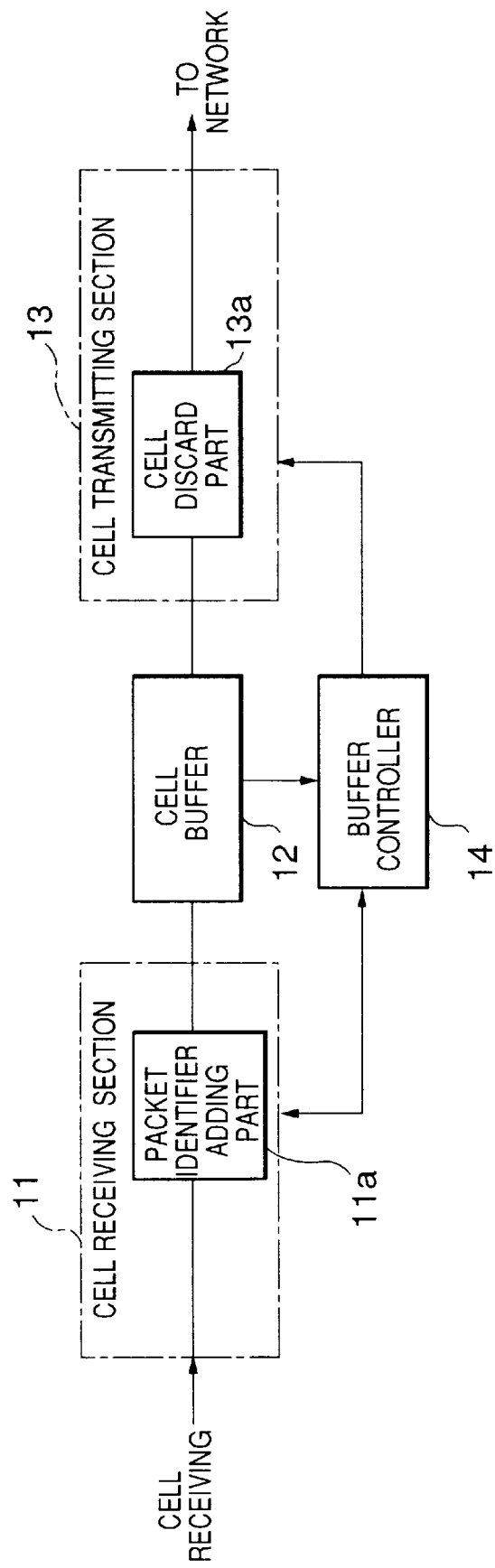
FIG. 4 is a block diagram showing a structure of second embodiment of a cell discard control system of the present invention.

FIG. 4 is a block diagram showing the structure of a second embodiment of the cell discard control system of the present invention. As shown in FIG. 4, the cell discard control system of this embodiment comprises a cell receiving section 11 having a packet identifier adding part 11a for adding a packet identifier to each of input AAL5 cells for identifying cells associated with the same packet, a cell buffer 12, a buffer controller 14, and a cell transmitting section 13 having a cell discard part 13a for discarding a cell in accordance with an instruction from the buffer controller 14.

A packet identifier is added to each of cells consisting of the same packet by the packet identifier adding part 11a as already having been explained. Cells thus added with a packet identifier are input to the cell buffer 12. When a cell discarding occurs due to overflow of the cell buffer 12, buffer controller 14 instructs the cell transmitting section 13 to discard cells having the same packet identifier as the discarded cell.

The buffer controller 14 controls the cell discard part 13a of the cell transmitting section 13 so as to discard cells which are input from the cell buffer 12 and having the same packet identifier as the discarded cell due to the cell buffer overflow, and controls the cell transmitting section 13 to output idle cells instead of discarded cells to the ATM network.

Therefore, the cell discard control system of this embodiment makes it possible, by discarding cells having the same packet identifier as a cell discarded due to buffer overflow, to prevent useless cells, which are unable to be restored to an original packet, from being transmitted to the ATM network.

Figure 5:
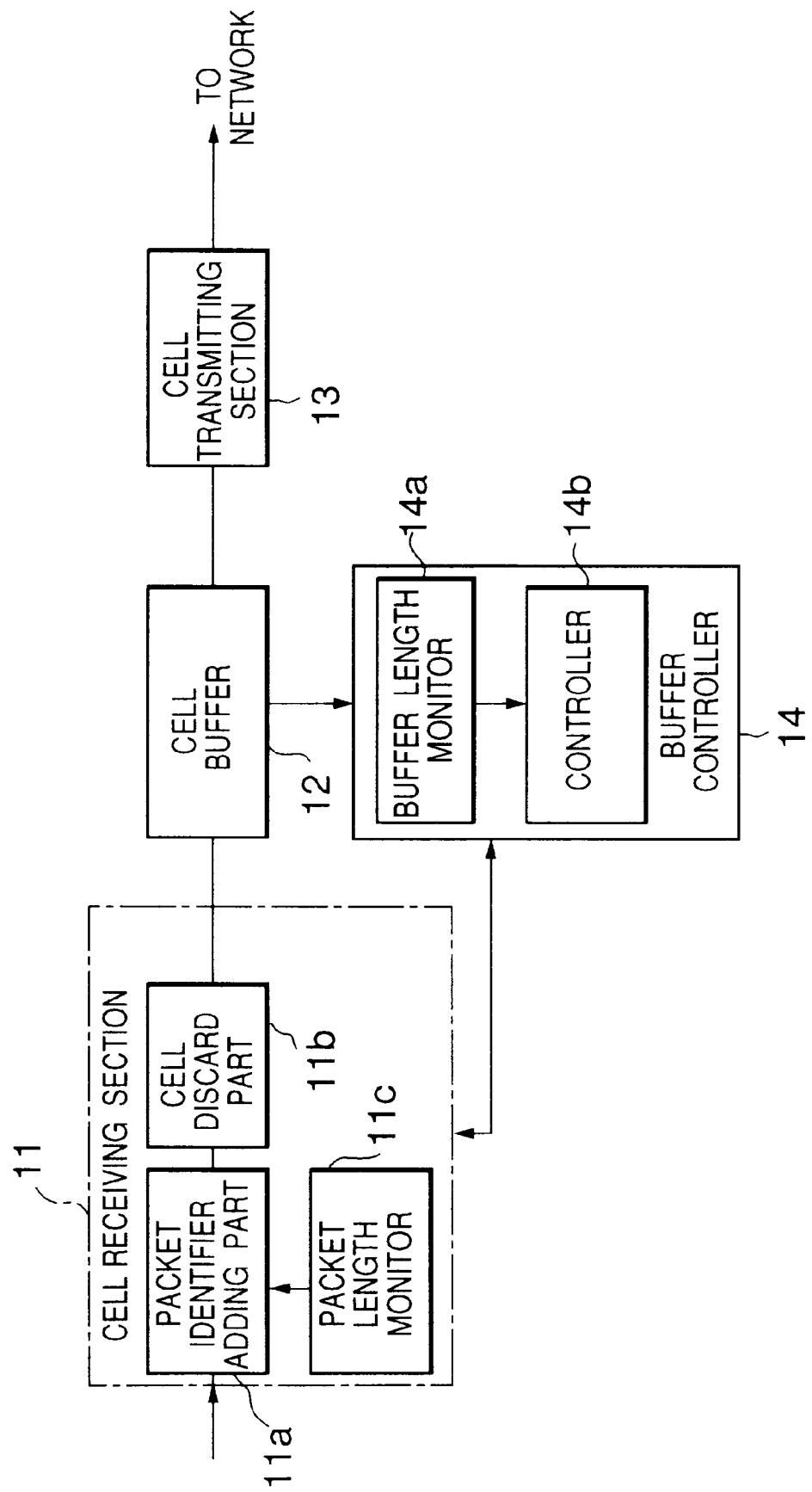
FIG. 5 is a block diagram showing a structure of third embodiment of a cell discard control system of the present invention.
Figure 6:
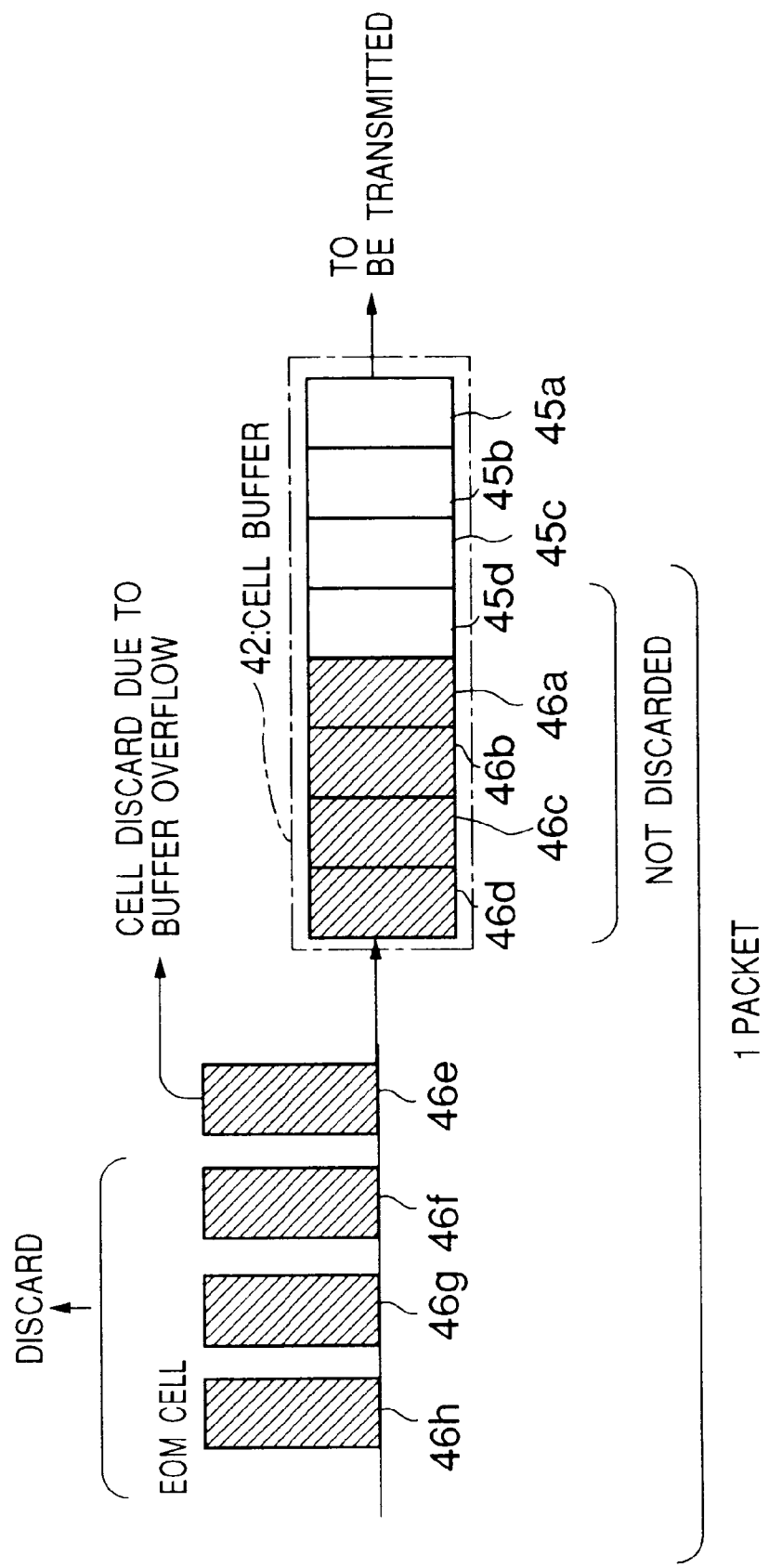
FIG. 6 is an illustration schematically showing operations of a partial packet discard system which is a conventional cell discard control system.
Figure 7:
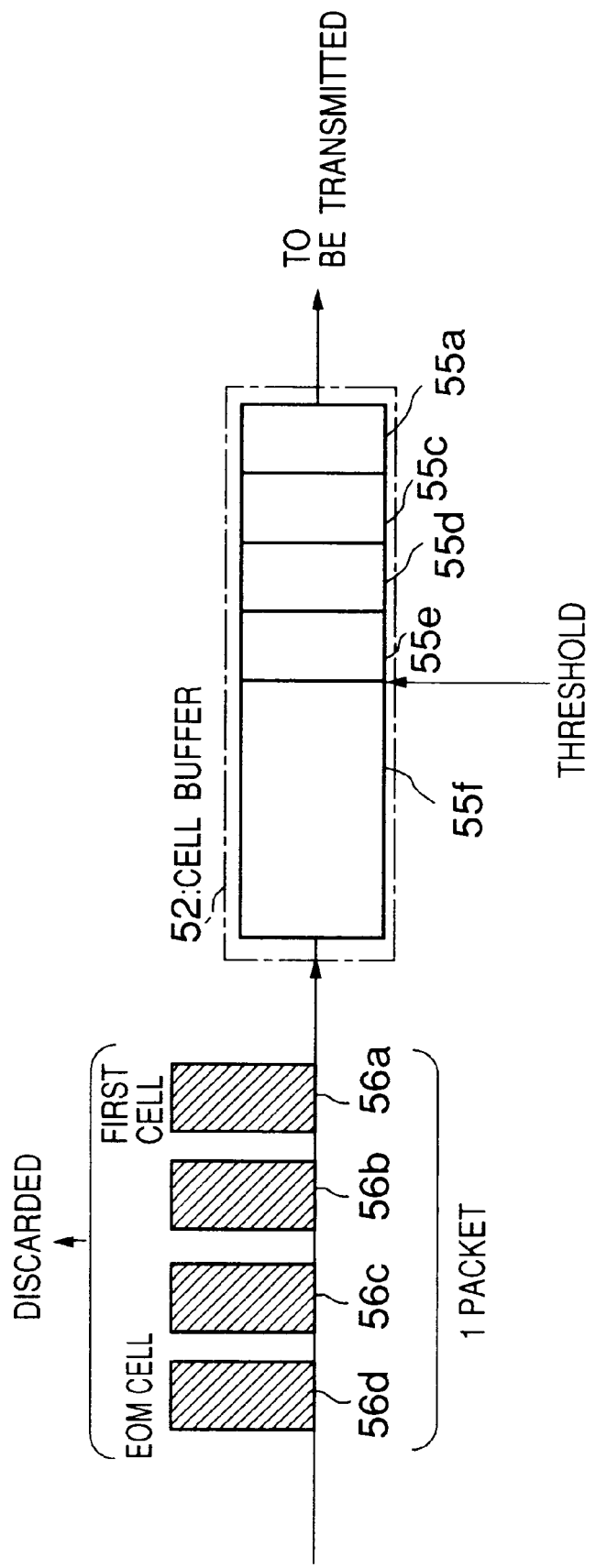
FIG. 7 is an illustration schematically showing operations of an early packet discard system which is a conventional cell discard control system.

FIG. 5 is a block diagram showing the structure of a third embodiment of the cell discard control system of the present invention, and this embodiment is the improved type of the early packet discard system. As shown in FIG. 5, the cell discard control system of this embodiment comprises a cell receiving section 11 having a packet identifier adding part 11a, a cell discard part 11b and a packet length monitor 11c, a cell buffer 12, a cell transmitting section 13, and a buffer controller 14 having a buffer length monitor 14a and controller 14b.

A packet identifier is added to each of cells consisting of the same packet by the packet identifier adding part 11a as already having been explained. Cells thus added with a packet identifier are input to the cell buffer 12.

The buffer controller 14 monitors aqueue length remained by the buffer length monitor 14a, and when the number of cells in the cell buffer 12 exceeds a predetermined threshold at that point of time, the buffer controller 14 informs the cell receiving section 11 of the packet identifier of the cell being stored at the end of queue of the cell buffer 12 and queue length available for storing more cells. When such information is transferred from the buffer controller 14, the cell receiving section 11 performs the control of cell discarding as follows.

The cell discard part 11b allows cells, having the same packet identifier as informed by the buffer controller 14, to pass to the cell buffer 12, and discards all next incoming cells having different packet identifier except for the following condition. That is a number of cells consisting of a packet (packet length) is counted by the packet length monitor 11c, and if the packet length of the next packet is short enough to be stored in the cell buffer 12 comparing with queue length available informed by the buffer controller 14, cells of the next packet are also allowed to pass to the cell buffer 12.

Therefore, the cell discard control system of this embodiment makes it possible, to save a reached packet if the number of cells in the packet is smaller than a remaining queue length of the cell buffer.

The embodiments of the present invention are described above. However, the present invention is not restricted to the embodiments. Various embodiments following the principle of the present invention are included.

For example, in the case of first and second embodiments of the present invention above described, cell buffer 12 detects overflow of its own and communicates the identifies of discarded cells to buffer controller 14. However, it is also possible to detect overflow of cell buffer 12 by cell discard part 11b and communicate the identifiers of discarded cells to buffer controller 14 from cell receiving section 11.

Although the present invention has been fully described by way of the preferred embodiments thereof with reference to the accompanying drawings, various changes and modifications will be apparent to those having skill in this field. Therefore, unless these changes and modifications otherwise depart from the scope of the present invention, they should be construed as included therein.

What is claimed is:

1. A cell discard control system for an ATM (asynchronous transfer mode) cell buffer being provided at a line transmitting section of an ATM apparatus, comprising:

a cell receiving section for receiving a flow of AAL5 type ATM cells, for adding a packet identifier to each cell for identifying cells associated with the same packet, for detecting number of cells consisting each packet, and for discarding cells in accordance with instructions and outputting cells with the packet identifier;

a cell buffer for buffering a cell transferred from said cell receiving section;

a cell transmitting section for transmitting a cell transferred from said cell buffer to an ATM network; and a buffer controller for monitoring a queue length of said cell buffer available for storing cells, detecting a packet identifier added to a cell being stored at the end of a queue of said cell buffer when the queue length is shorter than a predetermined threshold value and instructing said cell receiving section to discard cells consisting a packet having a different packet identifier being detected except for a packet comprising a smaller number of cells than a remaining queue length available in said cell buffer.

* * * * *